(12) United States Patent
Trost

(10) Patent No.: US 10,876,384 B2
(45) Date of Patent: Dec. 29, 2020

(54) METHODS OF UTILIZING CARBON MONOXIDE TO INCREASE OIL RECOVERY AND PROTECT TUBULARS

(71) Applicant: Paul B. Trost, Golden, CO (US)

(72) Inventor: Paul B. Trost, Golden, CO (US)

( * ) Notice: Subject to any disclaimer, the term of this patent is extended or adjusted under 35 U.S.C. 154(b) by 0 days.

(21) Appl. No.: 16/434,287

(22) Filed: Jun. 7, 2019

(65) Prior Publication Data

US 2019/0284916 A1  Sep. 19, 2019

Related U.S. Application Data

(60) Division of application No. 15/918,883, filed on Mar. 12, 2018, now Pat. No. 10,316,631, which is a continuation-in-part of application No. 14/621,531, filed on Feb. 13, 2015, now Pat. No. 9,951,594, which is a continuation-in-part of application No. 13/935,925, filed on Jul. 5, 2013, now abandoned, and a continuation-in-part of application No. 13/438,820, filed on Apr. 3, 2012, now abandoned.

(Continued)

(51) Int. Cl.

| C09K 8/52 | (2006.01) |
|---|---|
| E21B 43/16 | (2006.01) |
| E21B 43/26 | (2006.01) |
| C09K 8/594 | (2006.01) |
| C01B 32/40 | (2017.01) |
| C09K 8/70 | (2006.01) |

(52) U.S. Cl.
CPC ............ *E21B 43/168* (2013.01); *C01B 32/40* (2017.08); *C09K 8/594* (2013.01); *C09K 8/70* (2013.01); *E21B 43/164* (2013.01); *E21B 43/26* (2013.01); *C09K 8/52* (2013.01); *C09K 2208/32* (2013.01)

(58) Field of Classification Search
None
See application file for complete search history.

(56) References Cited

U.S. PATENT DOCUMENTS

| 1,978,655 A | * | 10/1934 | Straight | .................. | E21B 43/18 |
| | | | | | 166/272.1 |
| 2,957,818 A | * | 10/1960 | Fischer | .................. | C10G 1/045 |
| | | | | | 208/390 |

(Continued)

FOREIGN PATENT DOCUMENTS

| WO | 8043833 | 4/2008 |
| WO | 13013295 | 1/2013 |

OTHER PUBLICATIONS

Daniels et al., "Carbon Monoxide Oxidation by Methanogenic Bacteria," Oct. 1977, Journal of Bacteriology, vol. 132, No. 1, pp. 118-126.

(Continued)

*Primary Examiner* — Angela M DiTrani Leff
(74) *Attorney, Agent, or Firm* — Holzer Patel Drennan

(57) ABSTRACT

A method of utilizing carbon monoxide to increase oil recovery includes injecting an effective amount of carbon monoxide, either as pure carbon monoxide or as a component of a gas mixture, into an oil reservoir. The carbon monoxide increases oil flow and rate of oil flow from the oil reservoir through a variety of chemical mechanisms. The carbon monoxide also reduces corrosion in oilfield tubulars due to the formation of a reduced iron species coating on previously oxidized (corroded) areas.

8 Claims, 12 Drawing Sheets

THERMODYNAMIC DATA SUPPORTING THE REDUCING EFFECTS OF CO ON OXIDIZED IRON COMPOUNDS $$CO + 2Fe(OH)_3 \rightarrow CO_2 + 2FeO + 3H_2O \qquad \Delta F = -9 \text{ kcal}$$

$$CO + 2Fe(OH)_3 \rightarrow CO_2 + Fe_2O_3 + 2H_2O + 2H+ \qquad \Delta F = -15 \text{ kcal}$$

*NOTE: A negative ΔF (Free Energy) value demonstrates the reaction will proceed.*

Related U.S. Application Data

(60) Provisional application No. 61/940,018, filed on Feb. 14, 2014.

(56) References Cited

U.S. PATENT DOCUMENTS

| | | | |
|---|---|---|---|
| 3,007,520 A * | 11/1961 | Frey | E21B 43/243 166/260 |
| 3,087,778 A | 4/1963 | Negra et al. | |
| 3,342,259 A | 9/1967 | Powell | |
| 3,457,996 A * | 7/1969 | Parker | E21B 43/24 166/288 |
| 4,183,405 A | 1/1980 | Magnie | |
| 5,073,270 A * | 12/1991 | Gallup | C02F 1/70 166/300 |
| 5,950,728 A | 9/1999 | Bingham | |
| 7,100,692 B2 | 9/2006 | Parslet et al. | |
| 7,341,102 B2 | 3/2008 | Kresnyak et al. | |
| 7,506,685 B2 | 3/2009 | Zubrin et al. | |
| 7,644,756 B2 | 7/2010 | Zhang et al. | |
| 7,866,389 B2 | 1/2011 | De Francesco et al. | |
| 8,627,886 B2 | 1/2014 | O'Connor et al. | |
| 8,991,491 B2 | 3/2015 | Kalinowski et al. | |
| 9,951,594 B2 | 4/2018 | Trost | |
| 2004/0033557 A1 | 2/2004 | Scott et al. | |
| 2004/0116708 A1 * | 6/2004 | Harada | A61P 43/00 546/285 |
| 2005/0239661 A1 | 10/2005 | Pferrele | |
| 2008/0217008 A1 | 9/2008 | Langdon et al. | |
| 2011/0046244 A1 | 2/2011 | Zubrin et al. | |
| 2011/0186296 A1 | 8/2011 | Cassidy | |
| 2014/0116708 A1 * | 5/2014 | Wadekar | C09K 8/74 166/307 |

OTHER PUBLICATIONS

Johnson, et al., "A Flue Gas Huff & Puff Process for Oil Recovery From Shallow Formations"; Society of Petroleum Engineers. SPE Paper 20269-MS, Jan. 1990, Abstract only.

Liu, et al., "Flue gas enhanced oil recovery (EOR) as a highly efficient development technology for off shore heavy oil in China"; Journal of Petroleum and Gas Engineering, v. 4(5), pp. 127-142, May 2013, 16 pages.

Markey, Craig, "Geophysical Properties of Carbon Monoxide When Used as an Enhanced Oil Recovery Agent," 2015 Colorado School of Mines Theses & Dissertations, 75 pages.

Meyer, James P., Summary of Carbon Dioxide Enhanced Oil Recovery (CO2EOR) Injection Well Technology, American Petroleum Institute.

Montano, Characterization of Iron Bearing Minerals in Coal, Department of Physics, West Virgina University, 1981.

"Reducing Atmosphere" retrieved Feb. 22, 2017 from https://en.wikipedia.org/wiki/Reducing_atmosphere.

S. Sayegh, S. Huang, Y.P. Zhang, R. Lavoie, Effect of H2S and Pressure Depletion on the CO2 MMP of Zama Oils, Journal of Canadian Petroleum Technology.

Watts, "Alternative Gas Injection Process" EORI Conference, The Linde Group, Sep. 2012, 32 pages.

Zhu, et al., "An EOR Application at Liaohe Oil Field in China"; First National Conference on Carbon Sequestration, Washington D.C., May 2001, 10 pages.

* cited by examiner

FIGURE 1
THERMODYNAMIC DATA SUPPORTING THE REDUCING EFFECTS OF CO ON OXIDIZED IRON COMPOUNDS $$CO + 2Fe(OH)_3 \rightarrow CO_2 + 2FeO + 3H_2O \qquad \Delta F = -9 \text{ kcal}$$
$$CO + 2Fe(OH)_3 \rightarrow CO_2 + Fe_2O_3 + 2H_2O + 2H+ \qquad \Delta F = -15 \text{ kcal}$$

*NOTE: A negative $\Delta F$ (Free Energy) value demonstrates the reaction will proceed.*

FIGURE 2
LACK OF OIL RECOVERY AT CO
CONCENTRATIONS OF < 3% CO

Composition of Gas Injected:     $CO_2$ 97.1%   CO 2.9%
Source of Oil:     LAK field, Newcastle WY
Type of Oil: Paraffinic, 19 gravity, 140 centipoise viscosity, reservoir temperature 50° F.
Pore Volume of 97.1% $CO_2$ and 2.9% CO injected: 1.7 pore volumes
Pore Volume of Oil Recovered: 3.9%

FIGURE 3
RECOVERY OF VISCOUS NAPHTHENIC/ASPHALTENE OIL BY CO AND $CO_2$ AT
LOW RESERVOIR PRESSURE
TAYLOR BIRD LEASE, LEAVANWORTH, KS

Initial Boiling Pt. = 30% > 590° F; Oil Viscosity @ 90° F = 143 cp; API Gravity = 24°; Density = 0.899 g/ml

| Field and Experimental Conditions | Pressure, psi | % OIL RECOVERED |
|---|---|---|
| Reservoir field pressure (as received) | 30 | Not Applicable |
| Reservoir pressure in slim tube inlet | 500 | Not Applicable |
| Reservoir pressure at outlet (point 1) | 270 | 27.0% |
| Reservoir pressure at outlet (point 2) | 0 | 81.5% |

FIGURE 4
INCREASED PERMEABILITY OF A RESERVOIR THAT HAS IRON-BEARING MINERALS AND HAS SUFFERED FORMATION DAMAGE

Test Apparatus: Sand and 5% bentonite packed column, 2" diameter and 12" long
Baseline Formation Damaged Permeability:   4.8 md (millidarcys)
Post CO Treatment to Improve Permeability:   9.1 md (millidarcys)

EFFECT OF CARBON MONOXIDE ON LINEAR CORE FLOOD TO INCREASE RESERVOIR MATRIX PERMEABILITY

EORGAS™
RESERVOIR PERMEABILITY INCREASE
(2 PHASE FLUID FLOW)

| CONDITIONS | mD |
|---|---|
| Initial Gas Permeability | 0.0004 |
| After CO Treatment (275%) | 0.0011 |
| Initial Water Permeability | 0.0091 |
| After CO Treatment (147%) | 0.0134 |

FIGURE 5
INTERFACIAL TENSION (IFT) LOWERING BY CO

CO-EORGAS
IFT EFFECT
(GRIEVE OIL)

| PRESSURE | OIL | WATER | IFT LOWERING |
|---|---|---|---|
| | CO, ppm ($C_6$) | CO, ppm | |
| 14 psi | <1600 | 28 | 18.8 w/o CO <br> 15.9 w/ CO |
| 2000 psi | 52,000 ($C_6$) | ~880 | 1.9(est) |

NOTE: The IFT of the oil sample without the presence of CO was 18.8 dynes/cm2 whereas with the CO the IFT decreased to 15.9 dynes/cm2, thus demonstrating a lowering of the IFT.

NOTE: Since reservoir pressures commonly exceed atmospheric pressures, the lowering of the IFT will be greater due to the higher solubility of CO in the oil relative to the water.

FIGURE 6
RISING BUBBLE APPRATUS DEMONSTRATING A CHEMICAL INTERACTION BETWEEN CO AND $CO_2$ TO ACHIEVE HIGHER RATES OF GAS SOLUBILIZATION INTO VARIOUS CRUDE OILS

Rising Bubble Apparatus Dissolution Tests, %

| PROJECT / OIL | OIL TYPE | CO | CO2 | EORGAS | PRESS psi / TEMP °F |
|---|---|---|---|---|---|
| LAK 18° Gravity | Paraffinic | 25 | 35 | 50 | 450/85 |
| Taylor Bird 19° Gravity | Aromatic + Minor Parafins | 37 | 54 | 94 | 500/105 |
| Grieve Oil 32° Gravity | Paraffinic + Trace Aromatics | ND | ND | 74 | 500/135 |
| Morton Field 42° Gravity | Paraffinic | ND | ND | 77 | 500/95 |

EFFECTS OF NITROGEN ON OIL RECOVERY USING A GAS MIXTURE OF CO AND $CO_2$ SHOWING ONLY MINIMAL LOSS OF OIL RECOVERY AT N2 CONCENTRATION OF 66% AND $CO/CO_2$ CONCENTRATION OF 34%

EFFECTIVENESS OF EORGAS (66% $CO_2$ AND 34% CO) TO RECOVER ADDITIONAL OIL AFTER WATER FLOODING HAS REACHED ITS ECONOMIC LIMITS, AND FASTER RATE OF OIL RECOVERY AS COMPARED TO PURE $CO_2$ UNDER SAME EXPERIMENTAL CONDITIONS

FIGURE 9
(Continued from Figure 8)
FASTER RATE OF OIL RECOVERY WITH CO AS COMPARED TO $CO_2$
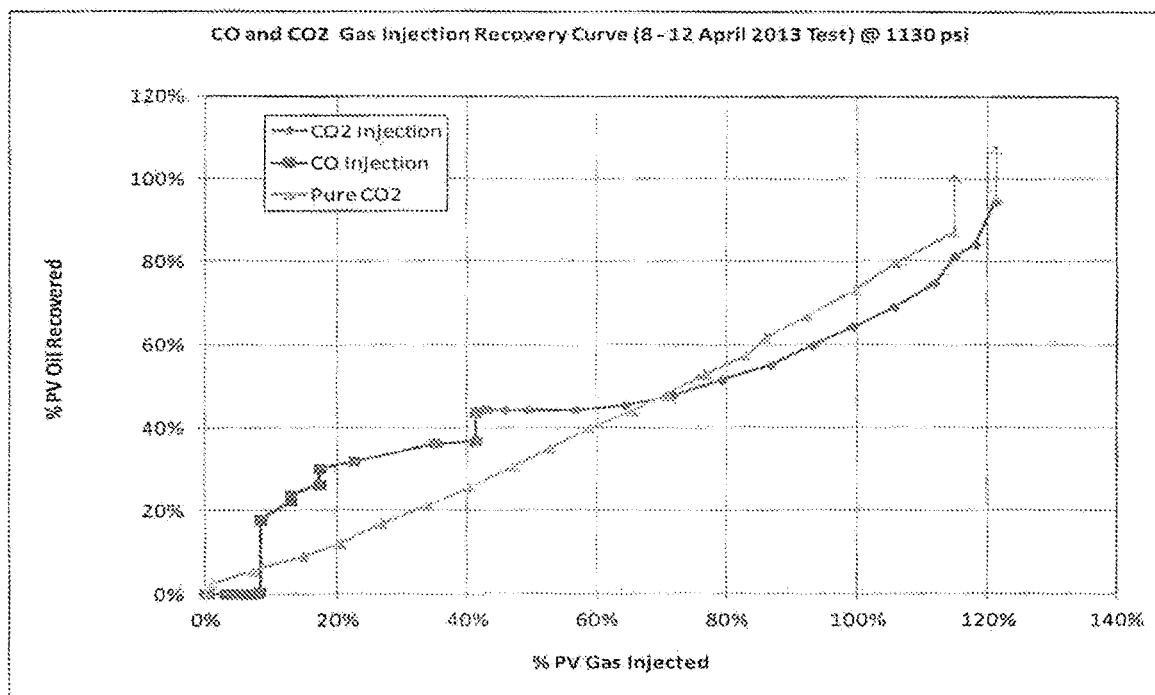

FASTER RATE OF OIL RECOVERY WITH EORGAS (COMBINATION OF 30% CO + 60% $CO_2$ + 10% $N_2$))

FASTER RATE OF OIL RECOVERY FOR EORGAS (60% $CO_2$, 30% CO, AND 10% $N_2$)
AS COMPARED TO PURE CO2 AT 1120 PSI

DEMONSTRATION OF CAPABILITY OF PURE CO TO RECOVERY OIL AND AT A FASTER RATE THAN PURE $CO_2$ AND DEMONSTRATION OF PURE $CO_2$ FOLLOWING THE CO OIL RECOVERY TO RECOVER ADDITIONAL OIL AS COMPARED TO PURE $CO_2$.

METHODS OF UTILIZING CARBON MONOXIDE TO INCREASE OIL RECOVERY AND PROTECT TUBULARS

CROSS REFERENCE

This application is a divisional application of U.S. application Ser. No. 15/918,883 filed Mar. 12, 2018, which is a continuation-in-part of U.S. application Ser. No. 14/621,531 filed Feb. 13, 2015, which claims the benefits of U.S. Provisional Application 61/940,018 filed Feb. 14, 2014, and which is a continuation-in-part of U.S. application Ser. No. 13/935,925 filed Jul. 5, 2013 (now abandoned), and which is a continuation-in-part of U.S. application Ser. No. 13/438,820 filed on Apr. 3, 2012 (now abandoned), all of which are incorporated herein by reference.

BACKGROUND

The disclosure relates to oil recovery methods and more particularly pertains to oil recovery methods for increasing flow rate and total recovery of oil and/or gas from a reservoir.

SUMMARY

An embodiment of the disclosure meets the needs presented above by generally comprising a method of injecting an effective amount of carbon monoxide into an oil reservoir. The carbon monoxide increases oil flow from the oil reservoir through a variety of chemical mechanisms, which in turn also increases a total amount of oil recovered. Additionally or alternately, the carbon monoxide increases the rate of oil flow from the oil reservoir through a variety of chemical mechanisms.

The carbon monoxide, injected from the surface into the reservoir or bore hole, increases the oil production and rate of oil production due to its chemical and physical properties as carbon monoxide, rather than being converted in some manner, e.g., combusted, reacted or disassociated into a different material such as $CO_2$, etc., and rather than being used as a generic gas, e.g., as a driver gas. It is the chemical and physical properties of CO that provide the observed and believed benefits; thus, changing the CO to anything other than CO does not provide the benefits of injecting the CO. The CO remains as CO, and is not reacted, e.g., with oxygen or by disproportionation, to form other materials such as $CO_2$.

There are certain chemical and physical benefits of having the CO in the reservoir or well bore. Physical benefits include: (1) the CO molecule has a very small diameter that facilitates infiltration of the CO into zones in the reservoir having lower permeability but higher residual oil saturation to help re-pressurize those zones; (2) CO has low solubility in water facilitating the migration of the CO to areas of the reservoir having low permeability but high residual oil saturation; (3) CO lowers the Interfacial Tension (IFT) between oil and water; such lowering allows spherical oil droplets to change shape into elongated "worm-type" shapes whose smaller diameters can migrate with the water through smaller pore throats to the producing well; and (4) the electron distribution of the CO molecule is similar to certain crude oil molecules, such as asphaltenes, allowing the CO to mobilize the asphaltenes out of the pore throat and facilitating migration of oil droplets through the now-open pore throat to the production well (thus providing a higher rate of oil production). One chemical benefit to utilizing CO is that the CO increases oil production rates by increasing the reservoir (matrix) permeability due to its reaction with certain ferric oxide and hydroxide species prevalent in certain reservoir minerals. Such reactions reduce the ferric oxide and hydroxides to ferrous oxides and liberates the bound water attached to the matrix, thereby shrinking the molecular diameters of the iron species and increasing the pore throats and matrix permeability. Another benefit is a reduction of corrosion in oilfield tubulars due to the formation of a reduced iron species coating on previously oxidized (corroded) areas.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a table showing the thermodynamically favorable reducing effects of carbon monoxide on oxidized iron compounds of a method of utilizing carbon monoxide to increase oil recovery according to an embodiment of the disclosure.

FIG. 2 is a table showing lack of oil recovery enhancement for volumes of carbon monoxide at less than 3.0%.

FIG. 3 is a table indicating recovery of viscous oil with carbon monoxide and carbon dioxide.

FIG. 4 is a table demonstrating increased permeability of an oil reservoir containing iron bearing minerals by injection of carbon monoxide.

FIG. 5 is a table describing the effect on interfacial tension by addition of carbon monoxide.

FIG. 6 is a table teaching the solubility of gases into various crude oils and the increase with a combination of carbon monoxide and carbon dioxide.

FIG. 9 is a graph demonstrating the capability of pure carbon monoxide to recover oil at a faster rate than pure carbon dioxide.

DESCRIPTION

Figure 7:
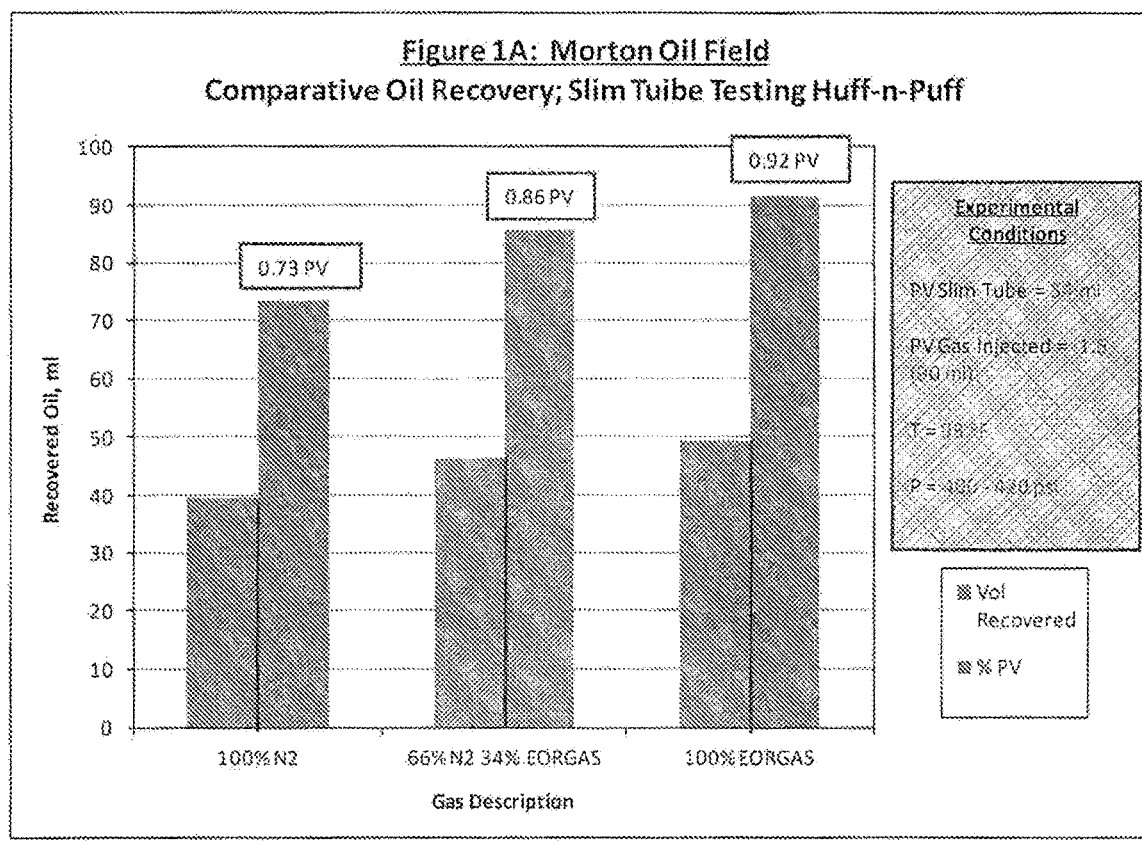
FIG. 7 is a graph indicating the effects of nitrogen on oil recovery using a gas mixture including carbon monoxide and carbon dioxide.

With reference now to the drawings, and in particular to FIGS. 1 through 12 thereof, an oil recovery method embodying the principles and concepts of an embodiment of the disclosure is described.

As best illustrated in FIGS. 1 through 12, the method of utilizing carbon monoxide to increase oil recovery generally comprises adding, e.g., injecting, carbon monoxide to an oil well for the purpose of enhancing oil recovery, which includes both total amount of oil recovered and the rate of oil recovery, as well as protecting the oilfield tubulars from corrosion caused by the presence of carbon dioxide ($CO_2$). The Figures provide results from laboratory tests demonstrating that injection of carbon monoxide, either as a pure gas or as part of a gas mixture (e.g., CO is at least 3% of the gas mixture), provides beneficial results compared to carbon dioxide alone.

Carbon monoxide (CO) has unique chemical properties due its electron cloud configuration that results in lower (e.g., limited) solubility in paraffinic hydrocarbons but higher solubility in aromatic hydrocarbons such as benzene, toluene, ethylbenzene, and asphaltenes. Further, CO is a very good reducing agent and is oxidized to carbon dioxide ($CO_2$). The molecular diameter of CO is 112.8 pm as compared to $CO_2$ being 232 pm. The smaller molecular diameter for CO has been found to result in a faster rate of movement into and through many natural materials such as water, hydrocarbons and oil/gas reservoirs.

CO has a critical temperature point of 132° K (−222° F.), and the critical pressure for CO is 34 atm (476 psi). Thus, contrary to $CO_2$, achieving the critical point for CO under natural reservoir conditions is unlikely. However, this low critical point may be beneficial for the recovery of oil under immiscible conditions. CO's solubility in paraffinic, aromatic, and asphaltene hydrocarbons may also be beneficial in the recovery of oil from oil reservoirs under primary, secondary, and/or tertiary oil recovery operations. As an example of CO solubility in paraffinic hydrocarbons, the mole fraction solubility in hexane varies from 0.02 to 0.3 depending on pressure. This relatively high solubility at reservoir pressures, common to oilfield applications, may be beneficial for all types of oil recovery operations.

Further, the strong reducing nature of CO could be beneficial in oil recovery operations from reservoirs that have significant iron-bearing minerals (clays), chlorite, glauconite, iron-bearing limestones and dolomites, and iron compounds adsorbed or absorbed onto the mineral surfaces. Typically, the reducing nature of the CO on iron hydroxides and oxides results in either elemental iron or a reduction in valence state from +3 to +2 valance state (see FIG. 1). Carbon monoxide may therefore be helpful with known problems such as the acidization of limestone reservoirs when iron is present. The beneficial reactions of carbon monoxide resulting in a reduction of valance state on iron-containing minerals and rocks can result in a stabilization of clays, an increase in the reservoir matrix permeability, a minimization of iron migration and its subsequent plugging of the reservoir rock during acidification of iron-bearing limestone and dolomites.

Also due to the strong reducing nature of the CO when in the presence of ferric ions, the CO, whether alone or in a mixture with $CO_2$ and/or with other gases and/or other anti-corrosive agents, will mitigate the corrosive effects of $CO_2$ and water on oilfield tubulars (e.g., pipes). Mechanistically, $CO_2$ with water (e.g., either water entrained with the $CO_2$ or water present in the reservoir) forms carbonic acid, thus oxidizing (rusting) the oilfield tubulars by forming ferric +3 oxides and hydroxides. The reducing nature of the CO causes reduction of the oxidized (rusted) oilfield tubulars to a ferrous +2 oxide compound that coats the tubular protecting it from further oxidation.

Due to the small diameter of the CO molecule, coupled with its unique electron cloud configuration, it has been found that CO, when injected into a reservoir, will move through the reservoir rock, the oil, and the water at a fast rate. Due to its solubility in oils, especially those oils containing aromatic hydrocarbons such as benzene, naphthalenes and/or asphaltenes, even at low pressures, (typically less than the Minimum Miscibility Point of $CO_2$ in the reservoir oil), the rate of oil production to the producing well is thus increased. Addition of CO can occur either in a pure CO form, or in a gas mixture of CO with hydrocarbon and/or non-hydrocarbon gases. For example, for numerous applications, the CO can be as a mixture primarily containing $CO_2$ and CO, or as a mixture of gases containing CO, $CO_2$ and other gases such as $N_2$, $CH_4$, or as a mixture of gases containing CO and $H_2$, optionally with minor amounts of any of $CO_2$, $CH_4$, (methane), $C_2H_6$ (ethane), $C_3H_8$ (propane), $C_4H_{10}$ (butane), $C_5H_{12}$ (pentane), for example. Water vapor may be present as a minor component of any of the gas mixtures.

Production of CO may occur as either essentially pure CO or as a component of a mixture of gases, e.g., a mixture referred to as EORGAS. CO, or CO in a mixture of hydrocarbon and/or non-hydrocarbon gases, may be produced by any number of conventional industrial processes including, for instance, pyrolysis of organic compounds, the burning of natural gas or the burning of oilfield flared hydrocarbon gases in a limited oxygen environment within modular on-site or fixed base units. In some instances, the CO is produced by a non-reformer process, meaning, the CO is not produced by reacting steam with hydrocarbon(s).

The CO, and if desired, the mixture of gases, may be formed or created on-site at the oilfield location, proximate to the well bore. Alternately, the CO and, if desired the mixture of gases, can be produced and transported to the oilfield location by trucks, rail, or other suitable transportation. In all instances, the CO is present as CO prior to being injected in to the well bore or reservoir. That is, the CO is not formed within the well bore or reservoir, e.g., by a reformer process. Also, as indicated above and further below, the CO remains as CO in the well bore or reservoir, and is not altered or converted in some manner, e.g., combusted, reacted with oxygen, or disassociated or disproportionated into a different material such as $CO_2$, etc.

CO has not been previously known to provide positive effects, either by itself or mixed with $CO_2$ and other gases, with respect to oil and gas recovery and production operations. In the current literature and commercial operations, injecting CO to increase oil production by increasing the reservoir permeability is not recognized as a process for increasing oil recovery. The literature and commercial operations do not recognize the potential benefits of injecting CO.

Although flue gas, typically containing a mixture of 70-80% $N_2$, 10-20% $CO_2$ and less than 3%, and more typically less than 0.3%, of CO, has been historically injected to increase oil recovery by re-pressurizing the reservoir, the inclusion of the CO component was unintentional and due primarily as an accidental by-product of producing gas containing what were thought to be the beneficial gases and primarily $CO_2$. For example, in a journal article by Dong Liu and Wenlin Li, *Flue gas*

*enhanced oil recovery (EOR) as a high efficient development technology for offshore heavy oil in China*, published in the Journal of Petroleum and Gas Engineering, v. 4(5), pp. 127-142 (May 2013), the authors reported flue gas and steam reduced oil viscosity of a heavy oil due to thermal effects. The authors failed to recognize any beneficial chemical effects of CO on heavy oil recovery and failed to recognize the potential for CO to increase permeability and thus increase production rate. Further, at the First National Conference on Carbon Sequestration held May 15-17, 2001 in Washington D.C., Chenglin Zhu, Fengshan Zhang, and Jim Z Q Zhou presented *An EOR Application @ Liaohe Oil Field in China*. The authors utilized flue gas together with steam to aid in the recovery of heavy oil from the oil field. Among their "main technical requirements for gas injection," they state "the component of flue gas should be $CO_2$>10%; Moisture<0.1%; $O_2$<2%; $N_2$ is around 88% and $SO_2$ is 0%." The authors go on to state that "impurities in flue gas" such as CO (and others) will cause corrosion; they view CO as a negative. In fact, attempts have been made to remove CO from flue gas. U.S. Pat. No. 7,341,102 to Kresnyak et al., titled "Flue Gas Injection for Heavy Oil Recovery," describes methods for thermal recovery of natural gas and bitumen using "modified" flue gas from steam generators conventionally used in Steam Assisted Gravity Drainage (SAGD) processes. Although this patent recognizes that the flue gas may include CO (see col. 3, lines 61-64: "This flue gas may contain numerous gaseous compounds including carbon dioxide, carbon monoxide, nitrogen, nitrogen oxides, hydrogen, sulfur dioxide, syngas inter alia."), a desire of Kresnyak et al. is to create a mixture without CO (see col. 3, lines 64-66: "At excess oxygen burning conditions, where oxygen levels are present in the flue gas 35, then the flue gas 35 will primarily contain carbon dioxide, nitrogen and water vapour."). CO is referred to as a "minor compound." Further, Kresnya removes "byproduct gas" which includes CO from the mixture to create his "modified" flue gas. Further, U.S. Pat. No. 8,991,491 to Kalinowski et al., titled "Increasing enhanced oil recovery value from waste gas" mentions capturing $CO_2$ from a combustion process and then purifying to >90-99.8% purity. These inventors specifically do not want CO present.

Figure 8:
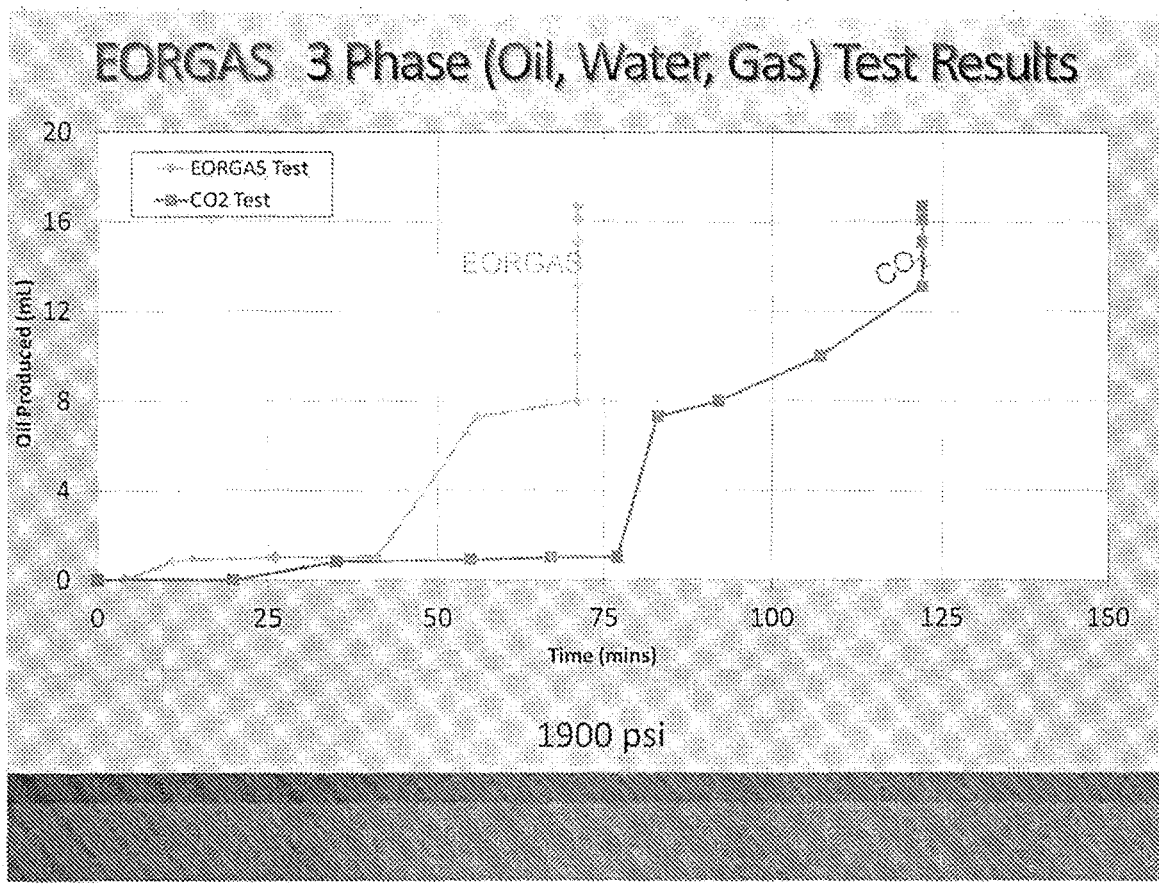
FIG. 8 is a graph providing evidence of increased oil recovery of carbon dioxide after water flooding compared to a mixture of carbon dioxide and carbon monoxide.

Consequently the beneficial effects of using CO in concentrations of greater than 3% has not been recognized, especially by those doing research in oil production, those working in oil production, nor by those producing scholarly writings. As seen in FIG. 2, oil recovery operations using $CO_2$ mixed with lower than 3% CO does not benefit or aid oil recovery. Alternately, when CO concentrations reach 10-30% CO in a mixture of $CO_2$ and CO, a total of 81.5% of the oil was recovered under controlled testing conditions of slim tube testing simulating oilfield conditions, as seen in FIG. 3. And as seen in FIGS. 8 and 9, the use of CO by itself and/or mixed with $CO_2$ and other gases was beneficial in recovering oil at a faster rate than pure $CO_2$. Thus addition of the CO to the $CO_2$ led to a faster solubilization and dissolution of this combined gas into the oil as compared to either single gas. Thus it has been determined that increasing the CO concentration to levels greater than 3%, preferably to levels greater than 10% and more preferably to at least 20%, will provide faster and greater oil recovery with lesser pore volumes of gas injected than was heretofore known in the oil recovery arts. As stated above and indicated in the Figures, levels of CO greater than 20% such as 30% and 40% offer additional recovery benefits.

A further application method of using CO would be the injection of the CO in concentrations and with or without other associated gases, as described above, into a reservoir, such as those having iron-containing minerals. This injection is done with the reservoir at a natural temperature or unheated state, e.g., the reservoir has not been heated, for example, by fireflooding or other exothermic reaction in the reservoir. It is well known in the field of petroleum engineering and oilfield operations that a normal or natural, unheated temperature for a reservoir or reservoir matrix is in the range of 50° F. to 250° F. If organic material (e.g., kerogen that gets converted to oil and/or gas) is above about 350° F. for even a relatively short geological time (e.g., a few hundred thousand years) any oil will be converted to condensate and then to gas. Above 500° F. the reservoir will contain dry gas after a few hundred thousand years. The theories provided herein as to why injected CO increases the oil production apply to normal or natural temperature oil reservoirs, not to reservoirs above about 250° F. and particularly not above 350° F.

In iron containing reservoirs, acidizing, fracking, and water injection can result in the formation of highly hydrated iron hydroxides and oxides that then form gels. Such gels will migrate and block the channel ways for the transmission of gas and oil and water thru the reservoir and pore throats, thus severely diminishing or even stopping any oil, gas and water recovery. The reducing nature of the CO may therefore be applied to treat such reservoirs and remove the hydrated iron species, or iron gels, due to reduction of the iron to a less or non-hydroscopic form of iron. The less hydroscopic, reduced form of iron will be of a much smaller diameter and result in the re-opening of the pore throats thereby allowing reservoir fluid movement back to the producing well. For example, ferric oxides, ferric hydroxides and other highly hydrated Fe+3 species of iron oxide(s) are reduced to Fe+2 iron oxides such as the mineral "wustite" (FeO), which is a small molecule. Fe+2 iron is thermodynamically favored over Fe+3 when ferric oxides and/or hydroxides encounter CO; see FIG. 1.

Yet another method and application comprises aiding oil and gas recovery from unconventional reservoirs such as shale oil and gas reservoirs, or other reservoirs having extremely low inherent permeability in the ranges of micro to nano-darcy permeability. These reservoirs typically contain various concentrations of iron-bearing clay minerals. The reducing nature of the CO or a mixture of gases containing CO would therefore increase the matrix permeability. Such an increase has been demonstrated by linear core flooding experiments and also by packed column testing (Markey, 2016).

As an example of the beneficial effect of adding CO to a reservoir to increase permeability and thus increase the rate of oil recovery, FIG. 4 shows the beneficial effects of repairing reservoir rock damage due to the presence of ferric iron bearing-minerals. The permeability of a packed column containing sand and 5% iron-bearing bentonite was flooded with 50,000 TDS water and the permeability was observed to be 4.8 milli-darcys (md). However after injection of 100% CO, and allowing the CO to react with the iron hydroxides in the bentonite, the permeability was increased by 189% to 9.1 md due to the reduction of the ferric ion-containing bentonite by CO to produce wustite or a non-crystalline form of wustite. Field application of CO injected in reservoirs damaged by iron-bearing clays, minerals, and the presence of hydrated ferric iron hydroxides and oxides can thus be repaired and increased oil production may be achieved. Also as shown in FIG. 4, a linear core flood on a known oil reservoir rock with CO increased the permeability to gas by 275% (from 0.0004 md to 0.0011 md) and to liquids by 147% (from 0.0091 md to 0.0134 md). These tests were conducted at room temperature, which is within the temperature range of a natural, unheated reservoir. The similarity of this and the previous packed column testing strongly supports the capability of the CO to increase reservoir permeability and thus increase the rate and total volume of oil production, as exemplified by Darcy's law, where an increase in permeability is proportionately related to an increase in oil production.

Still yet another application of CO to increase oil recovery would be the addition of the CO, or addition of a CO/$CO_2$ mixed gas, or a combination of $CO_2$, CO and $N_2$ mixed gas into a frac fluid such as water or carbon dioxide. Benefits of such addition of the CO or mixed gas containing CO would be the minimizing of water imbibing onto the frac face, formation of increased reservoir matrix permeability adjacent to the frac face, lowering the interfacial tension between the reservoir's oil and frac face water (see FIG. 5), stabilizing the reservoir's clays, minimizing the deleterious effects of any iron oxides and hydroxides and achieving a faster oil recovery plus a higher volume of total oil recovered.

Yet another application of the CO or CO-containing mixed gas is for secondary (water flooding) recovery operations to achieve increased oil recovery. CO, or CO-containing mixed gas, introduced into the water flood may result in the lowering of the interfacial tension between the water and oil (see FIG. 5), changing of the wettability of the reservoir rock, shrinking water sensitive clays and associated iron hydroxides and oxides, protecting the tubulars against corrosion and achieving faster oil recovery at water flood pressures after the water flood has essentially reached its economic limits. All of these benefits can occur under immiscible conditions. Yet another method would be the injection of the CO, with or without other associated gases, into existing or planned tertiary (EOR) oil recovery projects utilizing chemicals, such as the APS-(alkaline, polymer, surfactant) chemical floods, and also into steam floods and carbon dioxide floods. The benefit to an APS chemical flood for enhanced oil recovery is to minimize the adsorption of the APS chemicals on minerals having iron compounds on their surfaces. Such minerals could be, but are not limited to, iron bearing minerals and compounds, pyroxenes, amphiboles, sulfides and glauconites. Addition of CO, or CO in a mixture of gases, to a steam flood is also beneficial. Such steam floods target very viscous, high molecular weight crude oils where the oil gravity ranges from 9-19° API, reservoir temperatures are 40°-90° F., viscosities are 1000 to greater than 10,000 cp, and reservoir pressures vary from 10-2000 psi. Although the steam has a temperature of about 212° F., and in some implementations more due to it being superheated steam, the resulting reservoir temperature may be above 212° F. but typically still remains less than about 250° F. These heavy oil deposits typically are associated with iron-bearing clayey sandstones, with the clay being montmorillonite, illite, smectite, chlorite and glauconite, all of which have significant iron hydroxides content. As the steam encounters these swelling clays the reservoir permeability is greatly reduced. However the presence of CO may significantly alleviate this troublesome loss of permeability and its corresponding loss of production of oil. Thus the CO may be very beneficial for aiding oil recovery from these types of oil deposits. Additionally, another benefit of the CO for recovery of heavy oils is the mobilization of the asphaltenes, multi-ring aromatic hydrocarbons commonly present in heavy oils. One model, for asphaltene mobilization, is the capability of the CO to bind to the asphaltene and in so doing liberate or desorb the adsorbed or absorbed high molecular weight paraffins, resins, and/or kerogens. Such desorption would significantly decrease the effective molecular diameter of the asphaltenes allowing migration of the asphaltenes through the reservoir and to the well bore.

As a further description of steam flooding, high quality steam is injected into the reservoir. Such steam injection achieves increased oil recovery due to the physical processes of heating the crude oil to lower the viscosity and simultaneously increasing the reservoir pressure to facilitate movement of the less viscous oil thru the reservoir. However with the introduction of CO or a CO mixed gas into the steam, it has been found that the chemical benefits of the CO, such as its solubility in the crude oil, solubility in asphaltenes, and the lowering of the Inter Facial Tension between the crude oil and the water phase, coupled with the small diameter of the CO, results in an increased combined physical and chemical recovery of the crude oil. Such a combined process may therefore achieve both a faster rate of oil production coupled with a greater amount of total oil recovered.

Similarly the CO can be mixed with $CO_2$ to aid heavy oil recovery from reservoirs that are not steamed. Such a cold heavy oil recovery process, conventionally known as "CHOPS" by the oil industry, has been field tested, but the economics are poor. However, the introduction of the gas mixture of CO and $CO_2$ into a reservoir in its natural, unheated state, may lower the costs of the heavy oil recovery. One of the processes hindering cold heavy oil recovery is the presence of asphaltenes; these multi-ring aromatic hydrocarbons can result in plugging of the oil reservoir thereby limiting oil recovery. This plugging of the oil reservoir is often the result of deposition, adsorption and changing the wettability of the reservoir rock, all of which inhibit oil recovery. Plugging can also occur in the well bore tubular with subsequent buildup of both paraffinic and the multi-ring aromatic asphaltenes. However due to the interaction of CO with asphaltenes, as previously described, this plugging may be reduced and subsequently the cost of oil production decreased. As seen in FIG. 6, by the Rising Bubble Apparatus test results, the Taylor Bird oil (which has aromatics (e.g., asphaltenes) and paraffins) showed a significantly higher solubility of both the pure CO and the EORGAS (mixture of $CO_2$ and CO) as compared to only paraffinic oils of LAK and Morton Field. FIG. 3 shows that the Taylor Bird oil has a high percentage of asphaltenes and high molecular weight aromatics, as demonstrated by the industry-standard testing of boiling point to determine the asphaltene fraction. As shown, this Taylor Bird oil has a 30% fraction boiling at temperatures >590° F., which is indicative of a high asphaltene content. FIG. 3 also demonstrates a high recovery rate of this heavy oil without the need for heating as shown by a recovery of 81.5% of the asphaltene-rich oil at a test temperature of 90° F.

Thus injection of CO, either as a single gas component or as a mixture of CO and $CO_2$, is beneficial to the faster and greater volume of oil and gas recovery in primary, secondary, and tertiary (EOR) oilfield operations. More specifically with respect to the method disclosed herein, CO, when injected into a natural condition, unheated reservoir, assists in the recovery of oil and gas during primary secondary, and tertiary hydrocarbon recovery operations.

CO is readily available from, for example, either fixed or mobile sources utilizing pyrolysis or alternately by limiting oxygen during the burning of natural gas or flared oilfield produced gases, to produce a mixture of CO, minor $CO_2$, water vapor, and hydrogen ($H_2$). Typically this mixture of CO and $H_2$ may also contain minor amounts of $N_2$, and $CH_4$, especially if sourced from coal. The ratio of CO to $CO_2$ can be varied by varying the amount of pure oxygen supplied to the gas burner. Thus, if different reservoirs require different amounts of CO, or variances of the $CO/CO_2$ ratio mixture, the injected gases can be readily supplied from a single burner using various organic sources of feedstock. Other industrial processes also have the capability of producing large quantities of carbon monoxide and CO may be transported in pressurized vessels to any destination. Thus sourcing the gas is neither a technical nor economic problem. The CO produced can be transported to the oilfield in tankers or alternately produced on site at the oil field by the above, or other, processes. In all instances, the CO is present as CO prior to being injected into the reservoir; that is, the CO is not formed within the reservoir, e.g., by a reformer process. Also, CO is not injected at temperatures above natural reservoir temperatures, nor is the reservoir above natural reservoir temperatures, and therefore is not subject to modification, such as disproportionation, either before injection or after injection within the reservoir.

The CO may be injected down hole into any reservoir, at any stage (primary, secondary, and/or tertiary) of the entire oil recovery process.

As an example of primary oil recovery applications, during fracking of the reservoir, the CO could be co-injected into the fluids of the fracking materials, or, alternately, after blow down of the frac fluids, so that the CO migrates outward away from the frac face and into the reservoir to achieve increased permeability of the reservoir rock to speed up oil recovery. For fracking applications, the amount of CO added to the frac fluid may vary from 5% to 25%, depending on reservoir conditions, reservoir mineralogy, and frac design parameters.

An example of secondary, or waterflooding, phase of oil recovery operations is a reservoir that has swelling clays, iron hydroxides, glauconite, chlorite, smectite and illite minerals. Under this application the iron stabilization will generally occur due to the reducing effects of the CO on the hydrated iron hydroxides. After treatment with CO, the permeability will be increased and water flooding (secondary) operations will produce additional oil. The demonstrated effectiveness of the mixture of CO and $CO_2$ at low pressures to recover additional oil has been shown.

An example of tertiary phase of oil production operations benefiting from the presence of CO would include injection of the CO during chemical flooding (APS) and steam flooding of heavy oil reservoirs due to solubility of the CO in the oil. In tertiary phases, the methods envisioned would be using the capability of CO to lower the Interfacial Tension, stabilize iron and utilize its small diameter. CO or CO with a mixed gas has the capability to increase reservoir matrix permeability when iron-bearing minerals or chemicals or elements are present and also may be injected into existing $CO_2$ oil recovery projects.

In addition, CO reduces hydrated ferric iron hydroxide compounds to non- or poorly hydrated ferrous iron oxides and/or elemental iron. FIG. 1 demonstrates thermodynamic factors supporting such a reducing capability. This reducing capability is applicable to all phases of oil recovery operations. For example, the treatment of certain carbonate reservoirs containing trace iron is problematic due to the formation of the oxidized iron compounds during the addition of an acid treatment. The hydrated oxidized iron species forms gel-like substances that significantly impede the movement of the oil to the well bore and the CO concurrently inhibits such formation of these gel-like hydrated iron compounds. Further, CO may be used with glauconite-containing reservoirs that have iron compounds present and are susceptible to formation damage; carbon monoxide can repair such damage.

Figure 10:
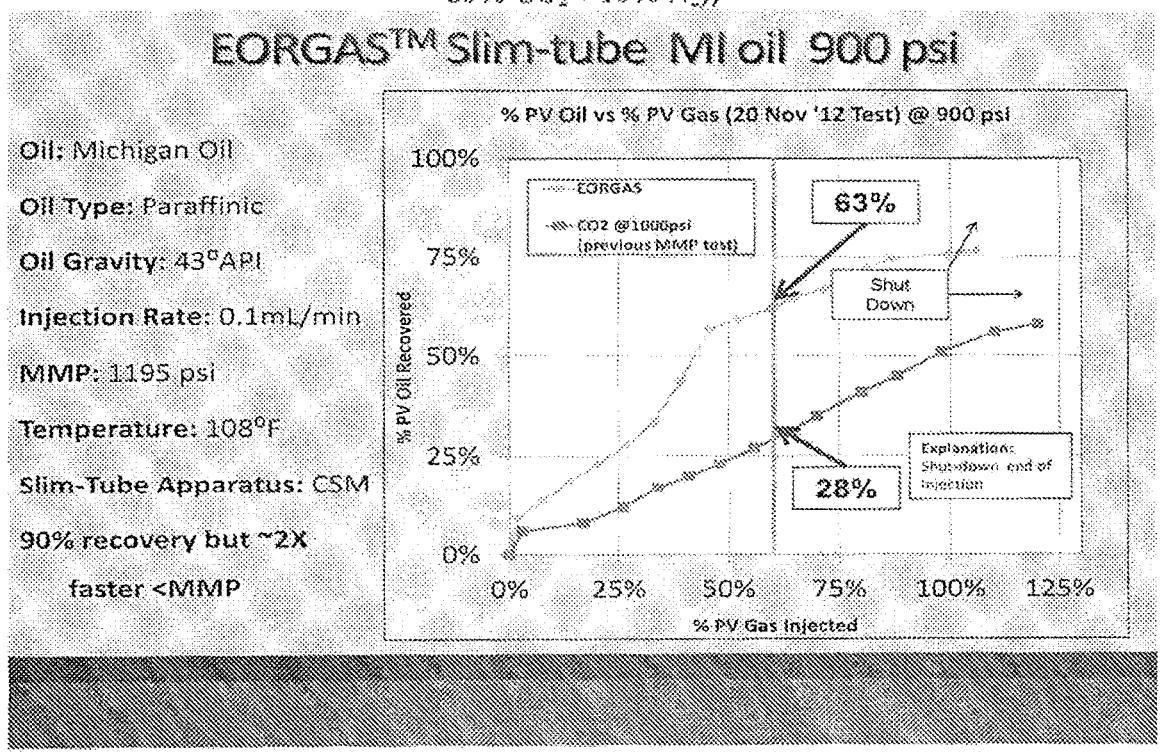
FIG. 10 is a graph demonstrating a faster rate of oil recovery of a mixture of carbon monoxide, carbon dioxide and nitrogen as opposed to carbon dioxide alone.
Figure 11:
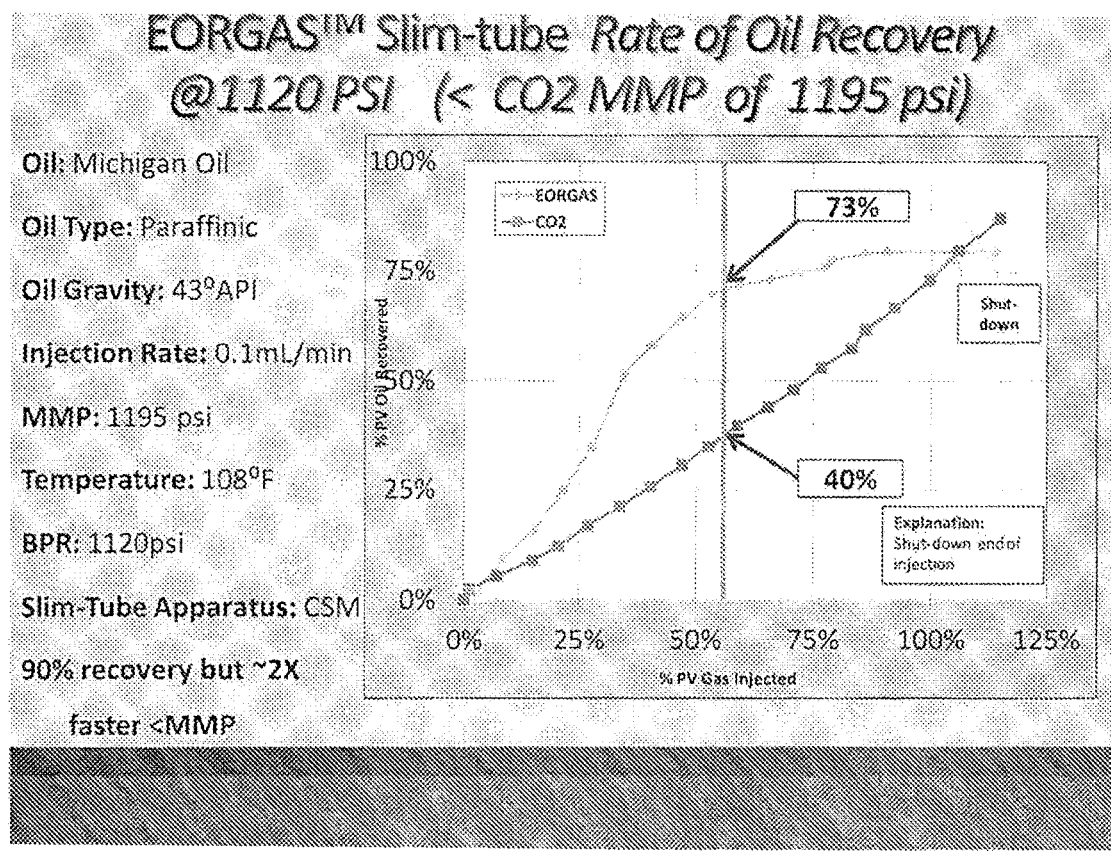
FIG. 11 is a graph indicating a faster rate of oil recovery of a mixture of gases compared to carbon dioxide alone.
Figure 12:
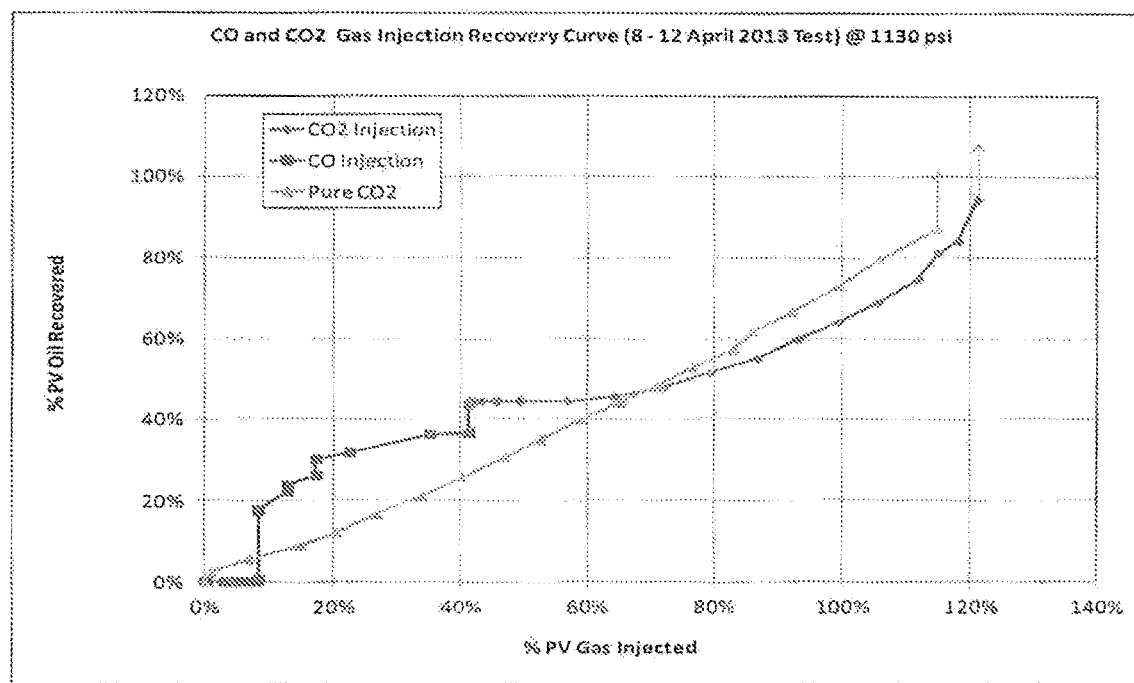
FIG. 12 is a graph indicating a faster initial rate of oil recovery using carbon monoxide compared to carbon dioxide alone.

Another application is the co-injection of the CO into existing $CO_2$, chemical or steam tertiary recovery operations to speed up the rate of oil recovery and improve the project economics. FIG. 9 and FIG. 10 both support the favorable recovery effects of the presence of CO alone (FIG. 9) and CO as a mixed gas (FIG. 10) for achieving faster oil recovery and for low pressure, non-miscible oil recovery of oils especially, but not limited to, oils having napthenic and asphaltene components.

Yet another application includes the increasing of reservoir permeability when certain clays such as smectite and illite are present particularly in shale oil reservoirs. FIG. 4, which depicts linear core flood results of CO into a reservoir core rock containing smectite and illite, supports this observation.

The lowering of the interfacial tension between the oil and water will aid in the recovery of additional oil during fracking operations as well as post fracking operations. FIG. 5 demonstrates the lowering of the interfacial tension of the crude oil in water at atmospheric conditions. However at reservoir conditions the concentrations of the CO dissolved in the oil phase will be significantly higher as seen in FIG. 5 and thus the interfacial tension lowering will be greatly increased.

Concentrations of CO injected can range from >3-99.99+ %, and can be injected with any number of other gases such as $CO_2$, $N_2$, air, and steam, but not limited to these gases. More particularly the CO concentrations will necessarily vary depending on reservoir clay content, iron oxide/hydroxide content, and the individual oil's interaction with the CO relative to lowering the Interfacial Tension and the solubility of CO in hydrocarbons. In general the CO concentration being introduced into another gas or liquid system will vary from 3-40% by volume. Alternately the CO concentration, if injected with the purpose of remediating formation damage, or conditioning an injector or producer well, and when no significant concentration of other injected gases are present, will vary from 40-99.99%.

Examples of Beneficial Applications of CO or CO in a Mixed Gas, to Increase Hydrocarbon Production Depending on the phase (primary, secondary or tertiary) of oil/gas recovery operations, the chemical and mineralogical nature of the reservoir rocks, and the intended purpose to be achieved, the concentrations of the CO and the method of presentation to the reservoir is variable. For example, for certain intended purposes, essentially pure CO may be the desired form of presentation however for other applications, CO in a mixture with $CO_2$ or, alternately, CO in a mixture with $CO_2$, $N_2$ and/or $N_2CO_2$, CO in a mixture with $N_2$, or CO mixed with other gases such as, e.g., $CH_4$, may be more advantageous to achieve the desired purposes. In all examples, the CO is injected into the reservoir rather than being formed in the reservoir and in some embodiments is sourced from a non-reformer technology.

Discussions of these variable reservoir conditions, phase of hydrocarbon recovery operations and reservoir mineralogy and geochemistry are thus discussed below.

1. Well Bore Remediation: Formation damage that occurs due to introduction of fresh water into a water sensitive formation containing smectite, illite, montmorillonite, bentonite, chlorite, ferric hydroxides and oxides, or glauconite. In addition, formation of hydrated iron hydroxides, during acidization of carbonate reservoirs, can also result in formation damage and plugging of the pore throats (loss of permeability). Injection of CO, either alone or as a gas mixture containing CO, into the well bore increases the permeability of the well bore by increasing the diameter of the pore throats, such as by shrinkage of swelling clays and other minerals.

Chemically CO reacts with the ferric hydroxide, which is hydrated, to reduce it to ferrous oxide and/or elemental iron, depending on specific reservoir chemistry, both of which are much smaller diameter molecules and less water sensitive than ferric hydroxide. Water of hydration is thus liberated and the pore throats are opened, thus increasing the matrix permeability of the well bore and allowing increased oil recovery and/or a faster rate of oil recovery. Alternately or additionally, the presence of CO may serve to shrink the swelling clays due to the loss of adsorbed water between layers of clay. As seen in FIG. 1 the thermodynamic free energy data shows this reduction of iron occurs. FIG. 4 shows linear corefloods have an increase in permeability by 275% after treatment with 100% CO. Due to the unique chemical interaction of CO and $CO_2$ as shown in FIG. 6, the rate of solubilization of a mixture of CO and $CO_2$ (identified as EORGAS in FIG. 6) far exceeds the rate of solubilization of either pure CO or pure $CO_2$ in four oil samples run at temperatures between 85-135° F. (particularly, 85° F., 95° F., 105° F. and 135° F.), all which are common, unheated well bore temperatures. Thus, this shows an application for well bore remediation using a mixture of CO and $CO_2$, with the CO present at >20%, but more preferably >30%, and up to 100% CO, with approximately up to 70% $CO_2$.

2. Primary Oil Recovery Operations: Fracking. Introduction of pure CO or a mixture of CO and $CO_2$ may be beneficial due to following mechanisms:

flushing oil from porosity and pore throats around well bore to effectively allow an extended, larger radius, more permeable well bore. For example, a 7" well bore results in decreased flow as oil approaches well bore due to small radius, however effectively increasing the radius to 2-4' allows more oil to migrate to the well bore quicker; and if the reservoir has water sensitive clays, reaction with the CO will increase the matrix permeability.

Introduction of CO, as pure CO or as a CO and $CO_2$ mixed gas, into the frac fluids will offer the following benefits:

lower IFT at the frac face thus allowing ease of oil to migrate thru the water wet frac face;

minimize inhibition of water at the frac face;

infiltration of CO into the matrix reservoir rock forming a dendritic pattern in the shale that will act to feed the frac face with oil at a greater rate;

a mixture of CO and $CO_2$ will increase oil recovery, e.g., at a temperature of 108° F., as seen in FIG. 10; and a mixture of CO and $CO_2$, or CO alone may result in a change in the wettability of the reservoir thus achieving greater oil recovery depending on reservoir mineralogy and geochemistry.

Testing has shown the beneficial range of concentration of the CO is generally 3-100% as seen in FIGS. 2 and 3 and FIGS. 8-10, depending on the mineralogy of the reservoir rock, the intended purposes of the application, and local reservoir conditions, including reservoir temperature. This beneficial range of concentration of the CO is particularly suited for reservoirs in a natural or unheated state, which is well known in the field of petroleum engineering and oilfield operations to be in the range of 50° F. to 250° F.

3. Secondary (Waterflood operations): Typically water flooding operations occur after primary oil recovery is deemed uneconomic to recover an additional 10-25% of the residual oil in the reservoir. However due to fact that water moves thru the reservoir rock easier than the oil, the water flood also reaches its economic limit when the ratio of water produced to oil produced is very large and thus the water flooding operation becomes non-economic. However introduction of a mixture of CO and $CO_2$ would be beneficial to achieve a greater percentage of oil per barrel of water produced. Reasons for this beneficial effect are as follows:

the mixture of CO and $CO_2$ has been shown experimentally to achieve more oil at low pressures even after waterflooding has occurred and the reservoir has reached economic limits (see FIGS. 8-11);

CO lowers the Interfacial Tension (IFT) of the oil in the water. This allows the oil droplet to turn into a worm-like configuration and thereby migrate through smaller pore throats, plus the oil "worm" is more readily dragged along with the water to the well bore;

CO increases reservoir permeability if hydrated ferric hydroxides are present;

the mixture of CO and $CO_2$ requires less pore volumes of injected gas than does injection of pure $CO_2$; and CO may change the wettability of the reservoir depending on reservoir mineralogy and geochemistry.

Testing has thus shown the effective range of gases in a mixture is CO at 10-60% and $CO_2$ at 40-90%.

4. Tertiary Oil Recovery: Injection of CO, either as a combination of CO and $CO_2$, or a mixture of CO, $CO_2$, $N_2$, $H_2O$ and other trace gases such as $CH_4$ and/or $H_2S$, into the reservoir (see all prior Figures and discussions above) has shown to achieve up to three times faster oil recovery as compared to pure $CO_2$. This faster oil recovery is achieved at lower pressures and at significantly less volumes of gas injected per barrel of oil produced as compared to pure $CO_2$. Reasons for these beneficial effects are as follows:

the mixture of CO and $CO_2$ has been shown experimentally to achieve more oil at low pressures even after water flooding has occurred and the reservoir has reached economic limits (see FIGS. 8 and 9);

CO lowers the Interfacial Tension (IFT) of the oil in the water;

CO increases reservoir permeability if hydrated ferric hydroxides are present;

the small diameter of CO as compared to $CO_2$ allows faster migration of the CO through the reservoir and associated oil and thus faster oil production; further the smaller diameter of the CO, as compared to $CO_2$, allows infiltration of the CO into zones of low permeability within the reservoir, i.e., bypassed zones, thereby achieving greater oil recovery from these zones;

solubility of the CO in both paraffinic and aromatic hydrocarbons, at low pressures, results in faster oil recovery at pressures typically well below pressures required by $CO_2$ recovery of the same oil;

CO is fifteen times more soluble in hydrocarbons than in water thus the CO of the $CO_2$ mixture migrates to the oil-rich bypassed zones in the reservoir and facilitates hydrocarbon recovery;

CO is less soluble in water than $CO_2$ and thus prefers to enter the hydrocarbon phase and thus facilitate oil recovery; and the mixture of CO and $CO_2$, even with up to 40% $N_2$ present, results in a faster rate of solubilization into the crude oil hydrocarbons than any of pure CO, pure $CO_2$ or pure $N_2$ (see FIG. 7, the testing for which was done at 98° F., which is in the range of a natural, unheated reservoir temperature).

Testing has shown that the range of concentrations for Tertiary oil recovery for CO is between 10% and 60% and for $CO_2$ between 40% and 90%. This wide range is due to the reservoir mineralogy and geochemistry, particularly if iron bearing minerals or compounds are present that would react with the CO thus requiring a higher ratio of CO as compared to a reservoir that has no reactive iron-bearing minerals or compounds present.

Discussion of Steamfloods and Shale Oil Applications of CO and a Gas Mixture of CO and $CO_2$ STEAMFLOODS: Tertiary steamflood recovery operations suffer from high operating costs due to heavy, viscous nature of the oil that makes it worth less upon sale. In addition certain heavy oil reservoirs that require steam flooding to recover the oil may have swelling clays such as bentonite, illite, montmorillonite and smectite or other iron-bearing minerals such as chlorite, glauconite and ferric oxides and hydroxides that swell in the presence of fresh water and steam. Such swelling minerals thus prohibit the infiltration of the steam into portions of the reservoir. As previously discussed, the presence of the CO, either as a single gas or as a gas mixture with $CO_2$ or as a gas mixture with $CO_2$ and other gases such as $N_2$, mitigates this adverse effect of clay and mineral swelling by reacting with the ferric hydroxides and oxides to produce a reduction in valence states of the iron to elemental iron or to ferrous oxides, which are not generally hydroscopic and thus are much smaller in diameter. This reduction in diameter thus results in an increase in reservoir permeability thereby allowing the injection of the steam into these damaged portions of the reservoir. In addition, steam flooding alone only achieves the two physical effects of both viscosity reduction due to temperature rise and the pressurization of the reservoir. CO or a mixture of CO and $CO_2$ would therefore be beneficial in achieving greater oil recovery due to:

increasing permeability, thereby allowing steam to contact portions of the reservoir that were previously blocked due to steam-swelling clay reaction;

solubility of CO in the heavy, viscous oils allowing decrease in viscosity of the oil and more migration to well bore;

heavy oil deposits typically have high concentrations of aromatic (asphaltene-type) compounds and CO is fairly soluble in aromatics coupled with a mobilization and lowering of viscosity of the asphaltenes;

a mixture of CO and $CO_2$ has been found to recover significant amounts of heavy oil during lab testing (see FIG. 3);

CO lowering the IFT (see discussion and benefits above and FIG. 5);

CO protecting tubular goods from corrosion, and therefore use of $CO_2$ when mixed with CO can be used with minimal adverse corrosion effects;

CO (or CO and $CO_2$) converting only the effects of a physical steam flood to both a physical and chemical recovery process thereby achieving increased oil recovery at no or lower volumes of steam injected;

CO has higher solubility in hydrocarbons as compared to $CO_2$ at lower pressures; and CO, or a mixture of CO and $CO_2$, may change the reservoir's wettability.

Testing has shown that for Tertiary oil recovery, suitable concentrations of CO are between 10% and 60% and of $CO_2$ are between 40% and 90%. This wide range is due to the reservoir mineralogy and concentrations of asphaltenes in the crude oil, especially if iron bearing minerals or compounds are present that would react with the CO thus requiring a higher ratio of CO as compared to a reservoir that has no reactive iron-bearing minerals or compounds present.

SHALE OIL/GAS APPLICATIONS: Oil and gas production from horizontal or vertically fracked shale oil wells typically declines 30% to 50% per month thus resulting in very poor percentage of oil/gas actually recovered from the reservoir. This rapid reduction in productivity may also be due to pore throat plugging by asphaltenes and their associated resins, kerogens, and paraffins. Water flooding is typically not feasible for these reservoirs due to very high clay content that results in low permeability combined with the potential to swell the shale clays, thus even further decreasing the reservoir permeability. In addition the numerous natural or induced fractures of the shale would promote the bypassing of any injected fluids through the fractures and not into the matrix of the reservoir where the residual oil is present. CO and or CO and $CO_2$ mixture would be beneficial for additional oil recovery due to:

CO lowers IFT (see above discussion);

CO increases matrix permeability to access previously trapped oil droplets;

shale oil has a mixture of aromatic, paraffinic, and asphaltene hydrocarbons; thus, the moderate solubility of CO in all of these, especially in the aromatics, will aid recovery of oil/gas.

As seen in FIGS. 3 and 6, CO and/or a mixture of $CO_2$/CO has solubility in asphaltenes. This solubility thus allows mobilization of the asphaltenes away from other long chain hydrocarbons and kerogen thereby minimizing the effective diameter of the kerogen-long chain paraffin-asphaltene. Reducing the effective diameter by desorbing or liberating the asphaltenes from the long chain hydrocarbons, kerogen, and other sorbed hydrocarbons, results in less blockage of the shale oil pore throats and higher transport of the shale oil to the well bore.

CO or a mixture of CO and $CO_2$ may achieve significant oil recovery increase during tertiary oil recovery operations due to the demonstrated capability of achieving oil recovery at lower oil pressures than required by $CO_2$ flooding (see FIGS. 10 and 11) thus minimizing the loss of the introduced gas along fractures. Also, greater infiltration of the CO or CO plus $CO_2$ gas, and other associated gases, from the fractures and into the matrix will occur, thereby accessing additional trapped oil. Successive Huff-n-Puff or line-drive injections of the CO or CO mixture will thus continually increase matrix permeability, thereby facilitating additional oil recovery.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

What is claimed is:

1. A method of protecting oilfield tubulars from corrosion, the method including injecting a gas mixture comprising carbon dioxide and at least 10% carbon monoxide into a reservoir at a natural unheated temperature in the range of 50° F. to 250° F. having tubulars therein, and reacting the carbon monoxide with an oxidized iron species on the oilfield tubulars to reduce the oxidized iron species on the oilfield tubulars.

2. The method of protecting oilfield tubulars from corrosion according to claim 1, wherein the gas mixture comprises at least 20% carbon monoxide.

3. The method of protecting oilfield tubulars from corrosion according to claim 1, wherein the gas mixture comprises at least 30% carbon monoxide.

4. The method of protecting oilfield tubulars from corrosion according to claim 1, wherein the gas mixture comprises at least 40% carbon monoxide.

5. The method of protecting oilfield tubulars from corrosion according to claim 1, wherein the gas mixture comprises the carbon monoxide and at least one of nitrogen ($N_2$), methane ($CH_4$), ethane ($C_2H_6$), propane ($C_3H_8$), butane ($C_4H_{10}$) or pentane ($C_5H_{12}$).

6. The method of protecting oilfield tubulars from corrosion according to claim 1, wherein the carbon monoxide reacts with the oxidized iron species on the oilfield tubulars to produce FeO.

7. The method of protecting oilfield tubulars from corrosion according to claim 1, wherein the carbon monoxide reacts with and reduces ferric oxides and hydroxides on the oilfield tubulars to reduced ferrous compounds.

8. The method of protecting oilfield tubulars from corrosion according to claim 7, wherein the carbon monoxide reacts with and reduces the ferric oxides and hydroxides to FeO.

* * * * *